Feb. 24, 1948.  N. F. McGAFFEY  2,436,521
TORQUE STABILIZER FOR AIRCRAFT
Filed Oct. 31, 1944

Inventor
NEILL F. McGAFFEY
By
Attorney

Patented Feb. 24, 1948

2,436,521

UNITED STATES PATENT OFFICE 2,436,521

TORQUE STABILIZER FOR AIRCRAFT

Neill F. McGaffey, Inglewood, Calif., assignor to Radioplane Company, Van Nuys, Calif., a corporation of California Application October 31, 1944, Serial No. 561,212

5 Claims. (Cl. 244—76)

My invention relates to aircraft and especially to remotely controlled, pilotless aircraft. More particularly considered, it is especially concerned with those remotely controlled aircraft in which only directional control and stability and vertical control and stability are usually provided.

Although, as will be made manifest, my invention may be used in other types of aircraft, for purposes of illustration it will be disclosed hereinafter in connection with that type of remotely controlled aircraft which is utilized as a target for aerial gunnery practice.

In such remotely controlled planes, particularly at the inception of flight, the torque-reaction brought to bear on the wing by the single engine and propeller usually provided in such aircraft is considerable. This reaction has a dangerous tendency to rotate the entire aircraft about its longitudinal axis. That is to say, if the propeller is one that rotates clockwise, the counterclockwise torque-reaction generated thereby tends to depress the lefthand wing; and vice versa if the propeller is one that rotates counterclockwise. Although a conventional airplane may be provided with "wash-in" on one wing half to counteract the torque-reaction, this aerodynamic feature on conventional airplanes is not at all effective for the present purposes, which are especially concerned with speeds below the minimum flying speed, such as take-off speeds.

Broadly considered, one of the chief aims of the present invention is to provide a remotely controlled plane, which, due to novel means effective to counteract the torque reaction at low speeds, will, despite the absence of a pilot and despite the fact that only directional and vertical control and stability are achieved by the remote control system, be also rendered stable about the longitudinal axis thereof, especially at take-off and other low speeds.

In connection with the achievement of this object, the inventive concepts are most particularly concerned with rendering such an aircraft non-susceptible to the highly unstabilizing effects occurring when the aircraft breaks engagement with the launching surface at the instant of the take-off.

A more specific object of the invention is to provide, in such aircraft, means which will maintain the taking off aircraft in lateral trim, and therefore prevent ground loops and side slips, until an air speed value is reached, whereat the conventional means for providing stability will be rendered effective for stabilizing purposes.

A still further specific object of the invention is to provide a novel latching mechanism, particularly well adapted to hold an airfoil in one predetermined aerodynamic position, and to automatically release the airfoil from the first position when the aerodynamic pressure on the airfoil reaches a predetermined value, the latch then re-engaging the airfoil in another predetermined aerodynamic position.

The other objects, features and accomplishments of the invention will become evident as this disclosure proceeds.

Merely for the purpose of illustration, the invention will be hereinafter described as incorporated in a plane of the type in which the propeller rotates clockwise, as viewed from aft of the airplane, but it is to be understood that the inventive concept would be equally applicable to an aircraft having a counterclockwise rotating propeller. The invention, however, can be satisfactorily embodied in a number of different forms other than the one chosen for illustrative purposes, as will become self-evident hereinafter, and it is therefore to be understood that the invention is limited in its embodiments, only by the scope of the accompanying claims.

Figure 1:
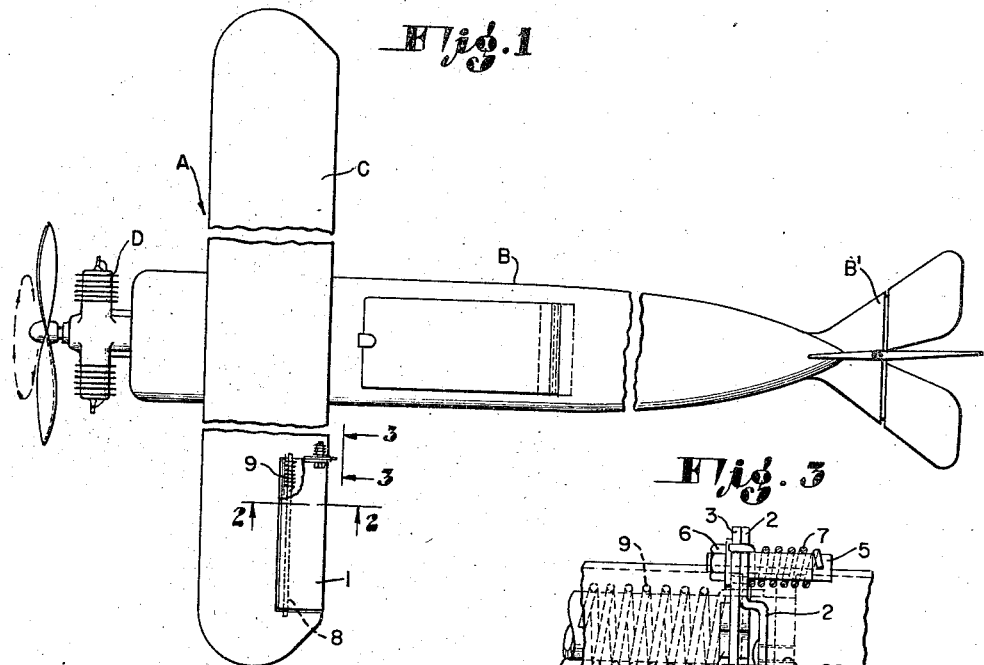
Fig. 1 is a top plan view, partly diagrammatic, of a target airplane embodying the present inventive concepts.
Figure 3:
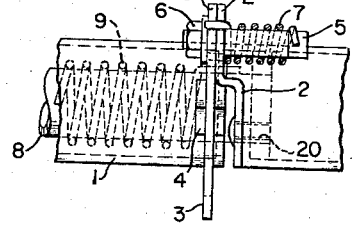
Fig. 3 is a fragmentary rear elevational view taken on line III—III of Fig. 1.

The aircraft A illustrated as a whole in Fig. 1, is a radio-controlled target plane, controllable vertically and horizontally by radio energy emanating from a remote-controlling station. By virtue of the present invention, most of the airplane can be designed along substantially conventional lines and principles. It is hence made up of a substantially conventional fuselage B, incorporating an empennage B' at its rear end; supporting a propulsion plant D at its front end; and having a main lift-surface or wing C attached thereto at a suitable point along its length.

In the preferred embodiment, since the engine and propeller rotate clockwise, the invention requires that the aforementioned torque counteracting means be provided in the left hand wing only. Such means comprise, among other instrumentalities, an auxiliary airfoil 1, rotatably mounted by means of a torque tube 8 in a cutout in the trailing edge region of the left hand wing. The cutout extends from an optionally located point adjacent the fuselage to another optionally located point adjacent the wing tip. It is contemplated among the present inventive concepts that this airfoil 1 be deflectable only from its neutral or trailing position to a depressed position lying below the lower surface of the wing and never rising above the trailing position. The predetermined maximum angle of downward deflection will depend, of course, directly upon the amount of propeller induced torque reaction brought to bear upon the wing. Thus, the deflection angle will be small if the propeller torque is relatively small. It will also depend directly upon the minimum flying speed, or take-off speed, of the aircraft. The higher the take-off speeds, the lesser the angle of maximum initial deflection required.

Since there are no pilot and no pilot operated controls in the aircraft, and since the remote control station has no direct effect upon the wing surface at any point, the present invention also contemplates the provision of a novel mechanism for maintaining the auxiliary airfoil in its optimum deflected position for take-off, and other low speeds. Further, means are provided for rendering this engagement effective only during that time period in which, due to torque reaction and the low aerodynamic pressure, the depressed wing half will tend to drop. More specifically, means are provided and arranged for cooperation with the auxiliary airfoil whereby in maintaining the airfoil in such a deflected position below the wing, as to effect a change in the aerodynamic configuration of the lowered wing, the result is that the effective camber of this wing half is increased. Such increase of effective camber increases the lift coefficient in that portion of the wing, and if the angle of deflection is not made too great, it does so without correspondingly increasing the aerodynamic drag of that wing half, thus providing a net counteracting restoring moment about the longitudinal axis which will neutralize torque reaction. In fact, if a downward deflection angle of the proper degree is chosen, at a value exactly necessary to bring the wing into lateral trim, there will, of course, occur only beneficial results, without any detrimental results, such as increased drag on this wing half, tending to turn the nose of the plane off its course. The airplane will hence take off trimmed properly about all three axes, despite the absence of a pilot and despite the ineffectiveness of the remote control apparatus as regards stability and control about the longitudinal axis of the aircraft.

More specifically considering the particular latch mechanism, the latch essentially comprises a rigid plate 2 extending chordwise of the wing and having a joggle or offset substantially at the midpoint of its vertical height at its rear end, and being attached, as at 20, at its lower edge to the adjacent wall of the cutout in the wing. The chordwise extending portion thereof, above the joggle, extends along the inboard side of the auxiliary airfoil in parallelism therewith and ends at the dotted line 2', shown in Fig. 2.

Passing at right angles to plate 2 through the upper end thereof is a rod 5. Near the outboard end of the rod 5 is pivotally mounted a member 3 for retaining the auxiliary airfoil in one or the other of the two predetermined positions. The member 3 is here shown, for purpose of exemplification, as a compound curved, hooklike detent, and is adjustably held against the plate 2 by a flanged nut 6. This nut bears against the recurved end of a spring 7 helically coiled around the inboard portion of the shaft 5. The recurved end of the spring serves both to anchor that end of the spring and to hold the member 3 in contact with the plate 2, the other end of the spring being anchored, as shown, by a flat or slabbed off portion on the other end of the shaft 5.

The member 3 has adjacent its upper end a rearwardly extending curved portion 3' and the front edge of the member 3 near its upper end is formed with a reentrant angle, or notch 3''. The lower front edge of the member 3 is formed into a finger 3''' angled upwardly from the body of the detent, at an angle determined by the angle to which the auxiliary airfoil is desired to be initially depressed for take-off purposes. The finger 3''' and the notch 3'' are connected along the front edge of the detent by a curved portion 21 having that radius of curvature which is adapted to most readily and rapidly guide the trailing edge of the auxiliary airfoil upwardly into the notch 3'', under the influence of the aerodynamic pressure generated at or after the take-off.

The trailing edge of the auxiliary airfoil 1, at or near its inboard end, bears a wear plate, or rubbing strip 4. This strip serves to relieve the fabric skin of the airfoil from damaging abrasions which would otherwise be imposed on the fabric by the co-action of the trailing edge of the airfoil with the various compound curves of the spring-urged detent member 3. This wear strip need not be of great extent and can consist of a material such as aluminum alloy or the like metallic material.

A spring 9 having a torque producing tendency is helically coiled around the torque tube 8 for a sufficient length thereof to exert a constant clockwise or downwardly turning torque on the airfoil 1, thus giving rise to a constant tendency for the member 1 to self-deflect downwardly.

Figure 2:
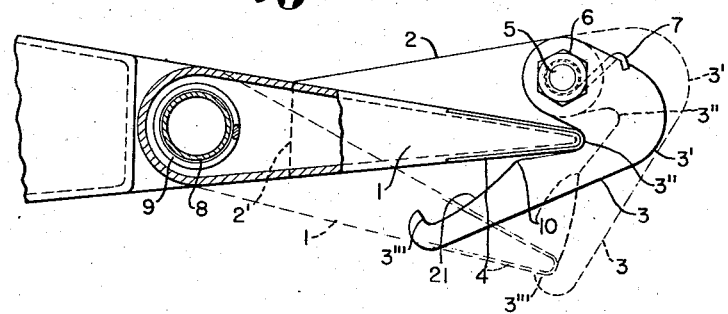
Fig. 2 is a detailed, chordwise, sectional elevation of line II—II of Fig. 1.

In service, at some time before the aircraft begins its take-off, the airfoil 1 is manually engaged with the detent 3 in the downwardly deflected position shown in Fig. 2 in dotted lines. By virtue of the torsion spring 7 on the tube 5, which creates a tendency for the detent 3 to rotate clockwise or forwardly, and by the cooperation of the helical spring 9 on the torque tube 8, which creates a tendency for the airfoil 1 to rotate downwardly, a balanced contact between the member 1 and the member 3 is established, in approximately the position shown. Thus, a positive predetermined angular engagement between these two members is effectuated.

The tensions of the springs and the various angles involved are so chosen as to maintain the member 1 in positive engagement with the member 3 up to a certain predetermined air speed, or forward velocity, of the aircraft. As the aircraft increases its forward velocity, this velocity finally becomes sufficient to generate an aerodynamic pressure on the airfoil 1 of a magnitude great enough to break the engagement shown in dotted lines in Fig. 2. The velocity at low take-off, or taxiing, speeds is, though not of this magnitude, nevertheless such as to establish an aerodynamic pressure upon the lower surface of the airfoil 1 sufficient to cause the same to set up an unbalanced, upwardly acting lift force counteracting the propeller torque on the wing and to maintain the wing horizontal, and laterally trimmed. Thus, even in taxiing, where the invention is employed in a craft having landing gear, all danger of the left wing dropping into contact with the ground and thus causing a ground loop, is precluded. Similarly—as the aircraft is put on a straight take-off course and the forward velocity of the aircraft is increased until the airplane reaches flying speed and takes off, all danger of the left wing being depressed sufficiently to cause the airplane to side slip is precluded.

Substantially as shown, as soon as the airplane has reached its cruising speed, or at any rate, as soon as the crucial low speed values have been exceeded, the aerodynamic pressure on the downwardly deflected airfoil 1 increases to such a value that the engagement between the lower end of the detent 3 and the trailing edge of the auxiliary airfoil is interrupted. By virtue of the continued aerodynamic pressure still creating an upward component on the airfoil, the trailing edge of the airfoil is thereupon urged upwardly along the inclined camway connecting the finger and the notch 3". As soon as the trailing edge passes the point 10, the detent 3 is suddenly urged forwardly by the spring 7, permitting the notch 3" to snap into place surrounding and contacting the strip 4 on the trailing edge of the airfoil. The location and arrangement of the detent and the various formations therein, especially that of the notch formation 3", are such with respect to the chord line of the wing and auxiliary airfoil as to thereafter positively and directly maintain the auxiliary airfoil 1 locked in a predetermined trailing or neutral position. The plan form area of the wing is thus materially increased and the aerodynamic center being constant and it being impossible for the airfoil 1 to rise above its trailing position, no matter what may be the speed of the aircraft, not only is lateral static stability provided by these means, but lateral dynamic stability can also be achieved thereby.

If flight speeds after take-off above those ordinarily contemplated for target planes are employed, the left hand wing may, if desired, be initially constructed along its entering edge with aerodynamic wash-in; that is, the angle of incidence of the entering edge of the wing may be gradually increased from the root to the tip thereof.

Although the invention has been shown and described with the auxiliary airfoil mounted in the left hand wing half, the scope of the invention also includes the concept of incorporating this auxiliary airfoil and its yieldable position-fixing mechanism, or latch, in the right hand wing half. The left hand wing half, in the latter case, is devoid of such an airfoil, the airfoil torque tube spring and the trailing edge engaging mechanism then being reversed, or otherwise adapted, to initially hold the airfoil in an upwardly deflected position, instead of a downwardly deflected position, for all speeds up to cruising speed. In such event, the effective camber of the right hand wing half will be decreased, thus decreasing the overall lift, or lift coefficient, of the right hand wing half. This wing half is thus depressed, by the reaction on it of the relative wind, sufficiently to bring up the left hand wing to horizontal or lateral trim. By these means, if desired, the propeller torque reaction constantly tending to depress the left hand wing half may be satisfactorily counteracted, especially at take-off speed and lower speeds. When the air speed of the aircraft reaches or exceeds cruising speed, however, the increased aerodynamic pressure and the latch mechanism associated with the airfoil, come into action to return it to the trailing or neutral position, similarly to, but reverse in operation from the previously described embodiment.

I claim as my invention:

1. An auxiliary aerodynamic structure for aircraft, comprising: a movable airfoil for, in effect, changing the camber of the wing, the trailing edge region of one wing half being cut out to receive the airfoil; a torque tube in the movable surface for rotatably mounting the airfoil in said cutout; a bracket attached by one face to the outboard wall of the cutout; a shift rigidly mounted in the upper end of the bracket; a member pivotally mounted on said shaft and spring-urged for rotation against the trailing edge of said movable airfoil; and formations on said pivoted member for engaging the trailing edge of said auxiliary airfoil in two vertically separated, differently aerodynamically effective positions.

2. In a wing of pilotless, radio-controlled aircraft: an airfoil movably mounted in the trailing edge region of the wing for rotation in the vertical plane about a spanwise axis; spring means mounted on the airfoil and wing along said axis for normally urging the airfoil downwardly; spring-urged detent means mounted on the wing having two formations engageable in respective positions with the trailing edge of the airfoil; said airfoil and detent means tending to rotate in opposite directions towards each other to normally hold the airfoil in a downwardly deflected attitude in engagement with one of said formations; and means responsive to a predetermined aerodynamic pressure on the airfoil for automatically disengaging the airfoil from said first formation and urging it into a substantially horizontal, wing-trailing position in engagement with said second formation.

3. In a pilotless, radio-controlled airplane: an auxiliary airfoil mounted in a spanwise cutout in the trailing edge region of the wing for rotation in a vertical plane; airfoil biasing means normally tending to urge said airfoil into a downwardly deflected position; a spring loaded detent member pivotally mounted on the body of the wing to extend into juxtaposition with the inboard end of said auxiliary airfoil at its trailing edge and having a spring urged tendency to rotate into engagement with the trailing edge of the airfoil, said airfoil and said spring loaded detent member at all speeds below a predetermined value being spring-maintained in angular contact with each other below the wing; and means in said detent and in said airfoil and responsive to aerodynamic pressures on the airfoil above said predetermined value, for disengaging the airfoil from said detent in said deflected position and forcing the trailing edge of said airfoil upwardly into locking relationship with another portion of the detent.

4. A device for providing lateral stability and trim in an aircraft, up to the cruising speed thereof, comprising: an auxiliary airfoil set into the trailing edge region of one wing half near the tip portion thereof, said airfoil being mounted therein for rotation in a vertical plane; means mounted on the same wing half near the inboard end of the auxiliary airfoil for normally engaging and holding the auxiliary airfoil in a downwardly deflected position when the aerodynamic pressure on the airfoil lies below a predetermined minimum; additional means in said first means and responsive to aerodynamic pressures on the airfoil above said minimum for causing said first means to yield to said pressures and allowing the airfoil to deflect upwardly towards its neutral or trailing position; and further means on said first named engaging means for engaging and holding said airfoil in a trailing position at said elevated aerodynamic pressures.

5. In combination: a wing half having a spanwise cutout in its trailing edge region near the tip of the wing half; an auxiliary airfoil mounted in said cutout and constantly subjected to torsion urging it downwardly; a substantially chordwise extending bracket located in part outboard of the inboard end of said airfoil and rigidly attached at its lower end to the inboard wall of the cutout; a stub shaft fixedly mounted in the upper rear end of said bracket; a detent member rotatively mounted on the outboard end of said shaft at its upper end and having its lower end extending into juxtaposition with the underside of said airfoil, said detent having two vertically separated, airfoil engaging formations on its front edge; means mounted on said shaft for constantly urging the lower formation on said detent into engagement with the trailing edge of said downwardly deflected airfoil at all aerodynamic pressures on the airfoil produced by taxiing and take-off speeds, the front edge of said detent between said spaced formations thereon being curved into congruity with the path of travel of the trailing edge of said airfoil to guide the trailing edge into said upper formation on the detent under aerodynamic pressures on the airfoil above the take-off speed, said upper formation being adapted to lock said auxiliary airfoil in its neutral or trailing position as long as the air speed of said wing exceeds take-off speed.

NEILL F. McGAFFEY.

REFERENCES CITED

The following references are of record in the file of this patent:

UNITED STATES PATENTS

| Number | Name | Date |
|---|---|---|
| 2,147,638 | De Port | Feb. 21, 1939 |
| 2,026,728 | Barnhart | Jan. 7, 1936 |
| 2,079,677 | Brown | May 11, 1937 |
| 2,167,533 | Solomon | July 25, 1939 |
| 1,190,374 | Capdevila | July 11, 1916 |

Certificate of Correction

Patent No. 2,436,521.  February 24, 1948.

NEILL F. McGAFFEY

It is hereby certified that error appears in the printed specification of the above numbered patent requiring correction as follows: Column 6, line 9, claim 1, for the word "shift" read *shaft*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*